(No Model.)　　　　　　　　　　　　　　2 Sheets—Sheet 1.
G. W. KEEN.
ELEVATED CARRIER.
No. 517,343.　　　　　　　　Patented Mar. 27, 1894.
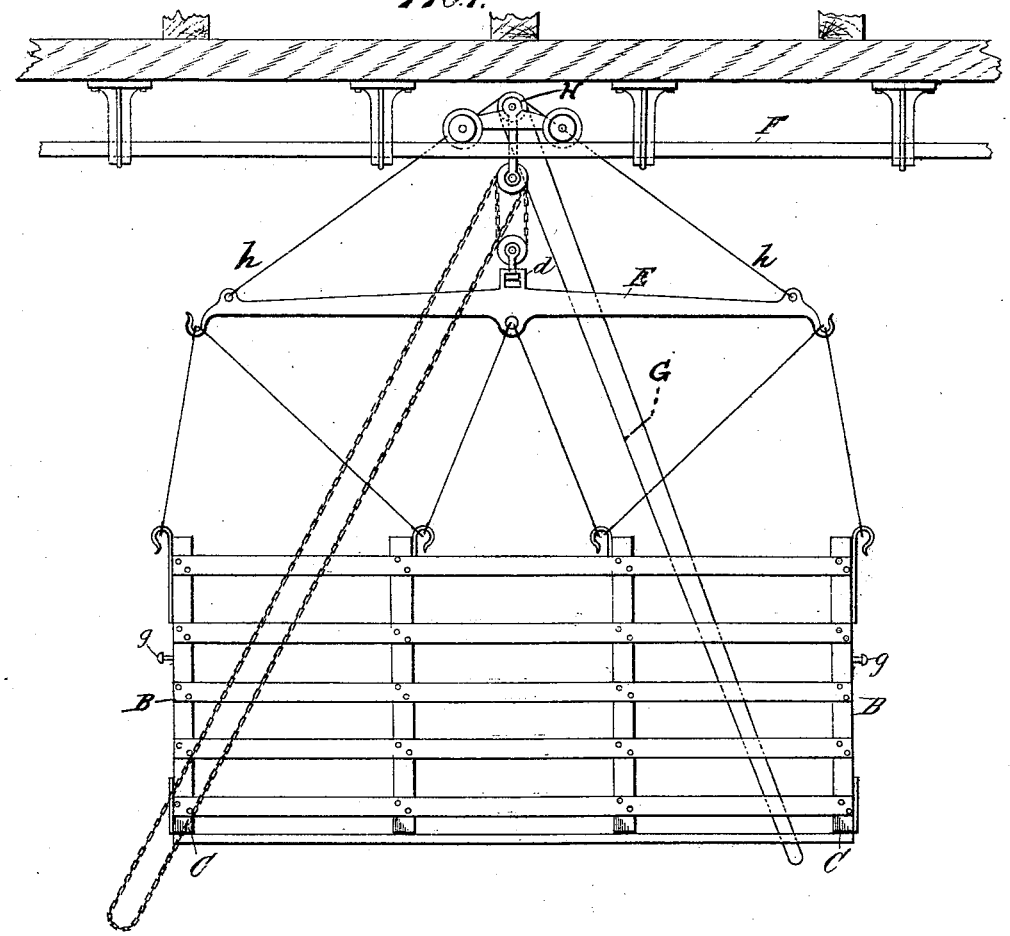
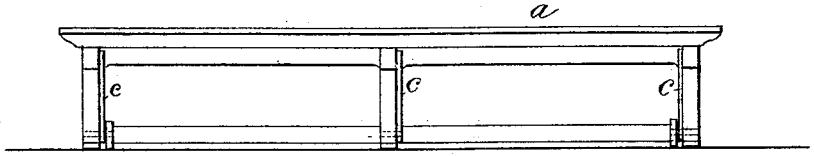
Witnesses:
John Buckler,
Paul C. Cloyd
Inventor:
George W Keen
By James C. Cloyd
Attorney.

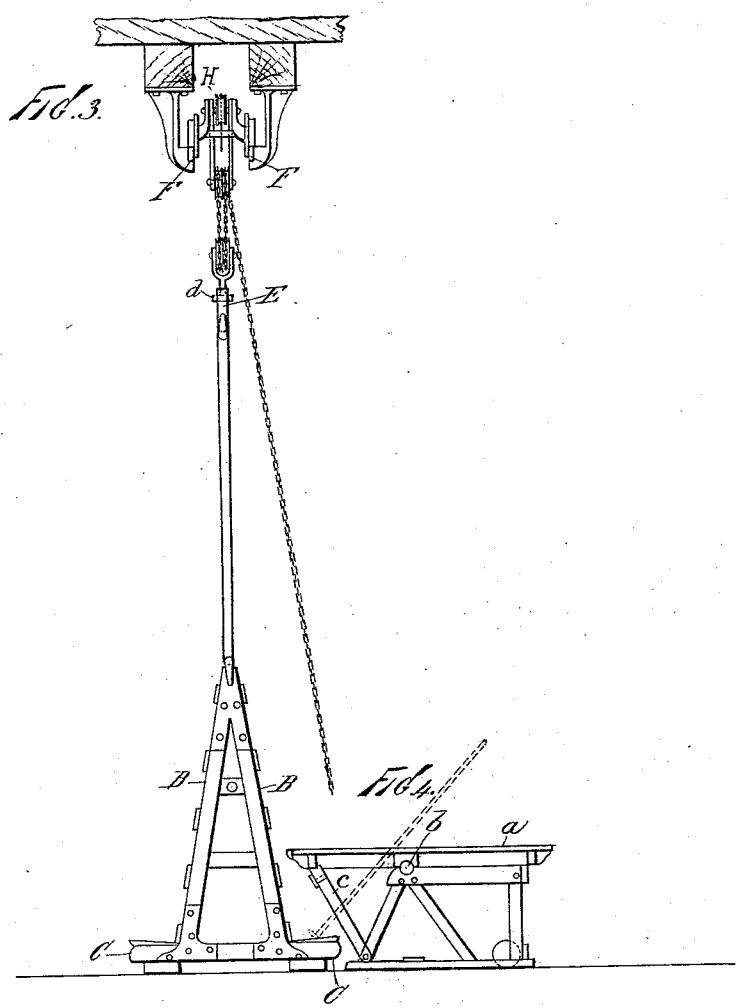

UNITED STATES PATENT OFFICE.

GEORGE W. KEEN, OF HACKENSACK, NEW JERSEY.

ELEVATED CARRIER.

SPECIFICATION forming part of Letters Patent No. 517,343, dated March 27, 1894.

Application filed September 26, 1892. Serial No. 446,946. (No model.)

*To all whom it may concern:*

Be it known that I, GEORGE W. KEEN, a citizen of the United States, residing at Hackensack, in the county of Bergen and State of New Jersey, have invented certain new and useful Improvements in Glass-Racks and Overhead Tramways for the Carrying and Moving of Plate-Glass and other Materials, of which the following is a specification, reference being had to the accompanying drawings, in which—

Figure 1 is a front elevation of my glass rack. Fig. 2 is a side view of the tilting table. Fig. 3 is an end view of the glass rack. Fig. 4 is an end view of the tilting table used in connection with my glass rack.

Similar characters refer to similar parts throughout the drawings.

The principal object of the invention is to provide a table and machinery by which plate glass of all sizes can be readily squared, and then carried and delivered to the proper parts of the warehouse.

My invention consists of an organized mechanism of the class described and the combinations which are also hereinafter described and claimed.

In the drawings $a$ represents the top of the table made practically of the height of the bottom of the glass ovens usually used in a glass foundry and so placed that the glass can be moved out from the ovens upon a level with the table. This table, as shown in the drawings, is so constructed that the bed plate or top of the table is hung on pivots, trunnions or other similar devices at $b$, and may be raised to any desired angle.

$c$ is a brace or other device so constructed as to hold the top of the table firmly during the process of squaring the glass, and so adapted as to be thrown back when the top of the table is to be tilted as shown. The rack B is of wedge shape, as also shown in the drawings, and is made of timbers of sufficient strength to hold from two to twelve or more large plates of glass when placed upon the foot C, C and against its inclined sides. The rack is suspended from the top on the beam E and is hung to the same by chains, rods or cables, of sufficient strength, the same being fastened to the ends and center of the beam E as shown in the drawings. The beam E is connected by differential pulleys or other hoisting devices to wheels connected as shown in the drawings, and run on a track F, which is suspended to the ceiling by proper brackets or depending hooks or bolts preferably so adjusted that the wheels will run outside of the brackets and on the edge of the track. This track may be what is called an "I" beam, or other form of overhead tramway with the wheels running on lower flanges. The rack is so arranged in connection with the pulleys as to afford an easy means of lowering or raising the same to the desired height and to be turned on a swivel joint or joints $d$. To hold the glass in position when on the rack and prevent its being displaced a wooden bar covered with felt or other suitable material is placed a short distance from the top and clamped or fastened by ropes or chains to bolts in the rack at or near the point $g$. Springs may be placed at the points where the rack is suspended to lessen any jar to the glass.

G is a rope, doubled on itself, its two ends $h$ $h$ crossing each other over a pulley H on the top of the truck and being secured to the opposite ends of the beam E. The function of this rope is to enable the operator to control the vertical movement of either end of the beam E, and also to enable him to move the truck along the track. Instead of a rope doubled on itself two ropes may be used.

In operating my mechanism the glass is first drawn from the oven and placed upon the table, and then squared. The table is then tilted to the requisite angle and the rack is lowered so that the plate or bed C, C will receive the tilted plate of glass, which is placed against either or both sides of the rack and moved readily any required distance or direction to be stored or finished. This mechanism is so designed as to save at least one half of the labor now required in transporting the glass from the ovens to the warehouse or finishing room, and by use of my apparatus one half of the men heretofore required to move the glass to the warehouse may be employed in preparing the removal of the glass from any other of the ovens.

I do not limit my invention to the particular devices shown in the drawings, but have shown a combination suitable therefor, which is the type of a class of such apparatus.

I claim—

An elevated carrier for plate glass, consisting of a rack to support the glass, a truck supported on an elevated track, a pulley depending from the truck, a beam E pivotally connected midway of its length to a second pulley, a cable rove round the said two pulleys to raise or lower the beam toward or away from the truck, suitable connections between the beam and rack to suspend the latter from the former, and a rope leading from each end of the beam over a pulley on the truck to control the vertical movement of the ends of the beam, and also to move the truck on the track, substantially as described.

GEORGE W. KEEN.

Witnesses:
FRANKLIN A. COLES,
PAUL C. CLOYD.